Figure 1:
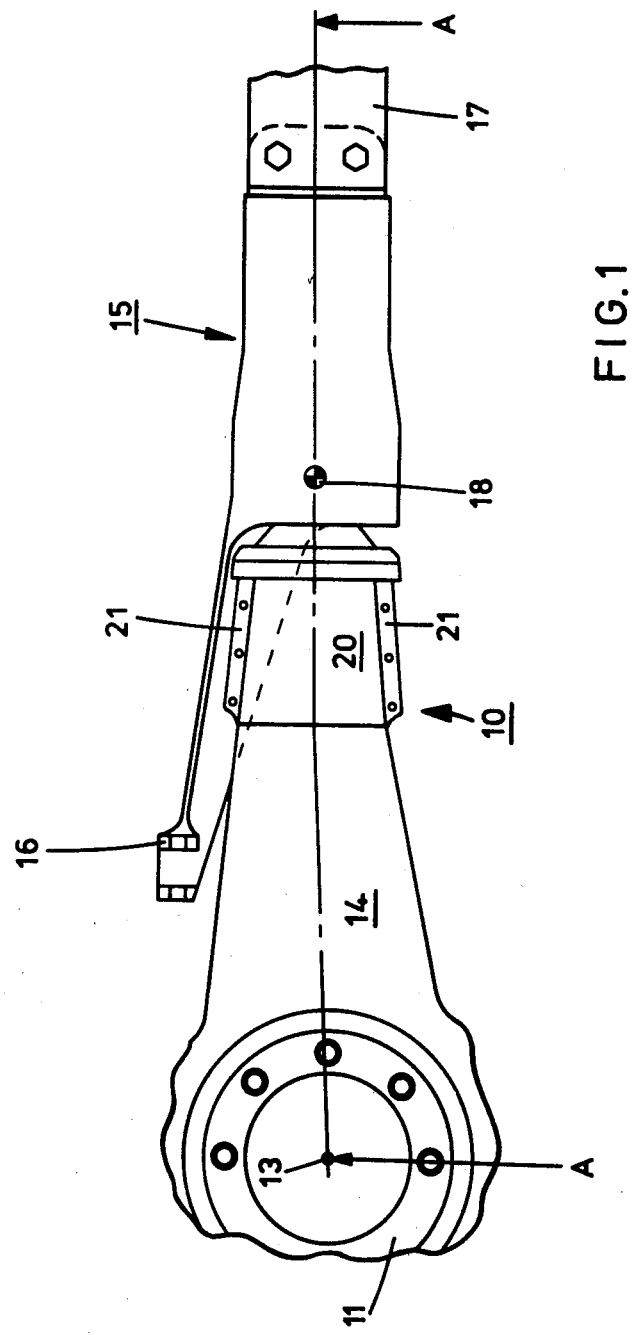

United States Patent [19]

Watson

[11] 4,129,403
[45] Dec. 12, 1978

[54] HELICOPTER ROTORS

[75] Inventor: Kenneth Watson, Yeovil, England

[73] Assignee: Westland Aircraft Limited, Yeovil, England

[21] Appl. No.: 814,038

[22] Filed: Jul. 8, 1977

[30] Foreign Application Priority Data

Jul. 15, 1976 [GB] United Kingdom ............... 29587/76

[51] Int. Cl.² .................... B64C 27/38; B64C 27/48
[52] U.S. Cl. ................................ 416/134 A; 416/138; 416/141
[58] Field of Search ................ 416/134 A, 138 A, 141

[56] References Cited

U.S. PATENT DOCUMENTS

| 3,026,942 | 3/1962 | Cresap | 416/138 A X |
| 3,556,673 | 1/1971 | Kiilian | 416/141 X |
| 3,700,352 | 10/1972 | Gorndt | 416/134 A |
| 3,790,302 | 2/1974 | Pascher | 416/141 X |
| 3,807,896 | 4/1974 | Johnson | 416/138 A X |
| 3,926,536 | 12/1975 | Ciastula | 416/134 A X |
| 3,942,910 | 3/1976 | Snyder et al. | 416/141 |
| 4,012,169 | 3/1977 | Mouille et al. | 416/134 A |
| 4,028,002 | 6/1977 | Finney et al. | 416/134 A |

Primary Examiner—Everette A. Powell, Jr.
Attorney, Agent, or Firm—Larson, Taylor and Hinds

[57] ABSTRACT

A helicopter rotor includes, for each of a plurality of rotor blades, a generally radially extending flexure member to accommodate blade flap movements, a feathering hinge for pitch change movements and an elastic shear mounting located within the feathering hinge to accommodate rotor blade lead and lag movements. Spaced-apart elastomeric bearings are utilized in the feathering hinge, and the elastic shear mounting is associated with the outer elastomeric bearing and is arranged to be substantially equally resilient in both the lead/lag and flap planes. The arrangement facilitates the incorporation of automatic damping in the lead/lag plane by selection of suitable material for the elastic shear mounting.

12 Claims, 4 Drawing Figures

HELICOPTER ROTORS

This invention relates to helicopter rotors.

Semi-rigid helicopter rotors are characterized by the absence of hinges that articulate the rotor blades to the rotor hub for flapping and lead/lag movements, such movements being accommodated by flexure members having appropriate elastic bending characteristics connecting the blades to the hub. In one such semi-rigid rotor construction, disclosed in our U.S. patent specification Ser. No. 3,926,536, the rotor blades are connected to a rotor hub through flexure members extending radially outwardly therefrom, each flexure member comprizing inner and outer parts connected through a feathering hinge. During operation, blade flap movements are permitted by resilient flexing of the inner parts and blade lead/lag movements are permitted by resilient flexing of the outer parts. Centrifugal loads are transmitted through tie bars extending through the centres of the feathering hinges to join the inner and outer parts of the associated flexure members.

In operation of the prior art rotor, flap and lead/lag fundamental frequencies are individually controlled by the inner and outer parts respectively of the flexure members and, in a preferred embodiment, the outer part of each flexure member is of matched stiffness in both the flap and lead/lag planes in order to minimize any undesirable bending/torsion coupling.

This concept results in a long flexure member due to the outer part being located entirely outboard of the feathering hinge which tends to increase drag loads during operation. Furthermore, the necessity to provide a tie bar results in added complication, and may also result in the feathering hinge being of a large diameter which may further increase drag loads. The utilization of mechanical bearings in the feathering hinge necessitates regular maintenance inspections and also requires the provision of a lubrication system and, if damping is required in the lead/lag plane in a particular installation, then this may require the provision of external dampers which represents further complication and added weight.

Accordingly, the present invention provides a helicopter rotor including a rotor hub arranged for rotation about a generally vertical axis and a plurality of rotor blades, the rotor hub comprising, for each rotor blade, a generally radially extending flexure member resiliently flexible in a blade flap plane, a feathering hinge located at an outer end of the flexure member and including a generally tubular portion having means at an outer end thereof for attachment of the rotor blade, the tubular portion being rotatably supported on inner and outer elastomeric bearings located in spaced-apart relationship on a spindle extending from said flexure member, and an elastic shear mounting associated with the outer bearing so as to permit lead and lag movements of the tubular portion and associated rotor blade about a geometrical center of the inner bearing.

Preferably, the inner bearing comprizes two in-series elastomeric bearing parts arranged on a support about the geometrical center, thereby minimizing an overall diameter in a particular installation. An outer surface of one of the bearing parts may be rotationally fixed to the tubular portion and an outer surface of the other of the bearing parts may be secured through a thrust member to the spindle so that, during operation, centrifugal loads are transmitted through the inner bearing to the hub.

The outer bearing may comprise an annular elastomeric bearing having an inner surface secured to the spindle and an outer surface secured internally of a co-axial sleeve, the elastic shear mounting being arranged between the sleeve and an inner surface of the tubular portion.

The elastic shear mounting may comprise an annular elastic shear member having one surface attached to a flange formed on an extension of the sleeve and extending generally perpendicular to the axis of the tubular portion and an opposite surface secured to a flange provided internally of the tubular portion.

In a preferred embodiment, the elastic shear mounting includes a second annular elastic shear member similarly attached at an opposite side of the outer bearing.

Preferably, each elastic shear member is constructed of synthetic viscoelastic material having suitable hysteresis properties to provide an automatic damping force when subjected to shear displacements.

Lead and lag stop means may be provided and, conveniently, the stop means may comprise an annular projection formed on an outer surface of the sleeve, the projection being arranged so as to abut an inner surface of the tubular portion at the permitted extremes of blade lead and lag movements.

The flexure members may be constructed of fibre-reinforced plastics material and, preferably, are formed as an integral structure with the hub.

Conveniently, an outer end of each flexure member may be formed with opposed longitudinally arranged frusto-conical portions. In such an arrangement an inner end of the spindle may be flared so as to mate with a surface of the outer portion, and shaped metal sleeves may be clamped around the inner portion and bolted through mating flanges to the periphery of the flared portion of the spindle. Such an arrangement provides a strong attachment capable of withstanding the centrifugal loads experienced during operation.

Figure 2:
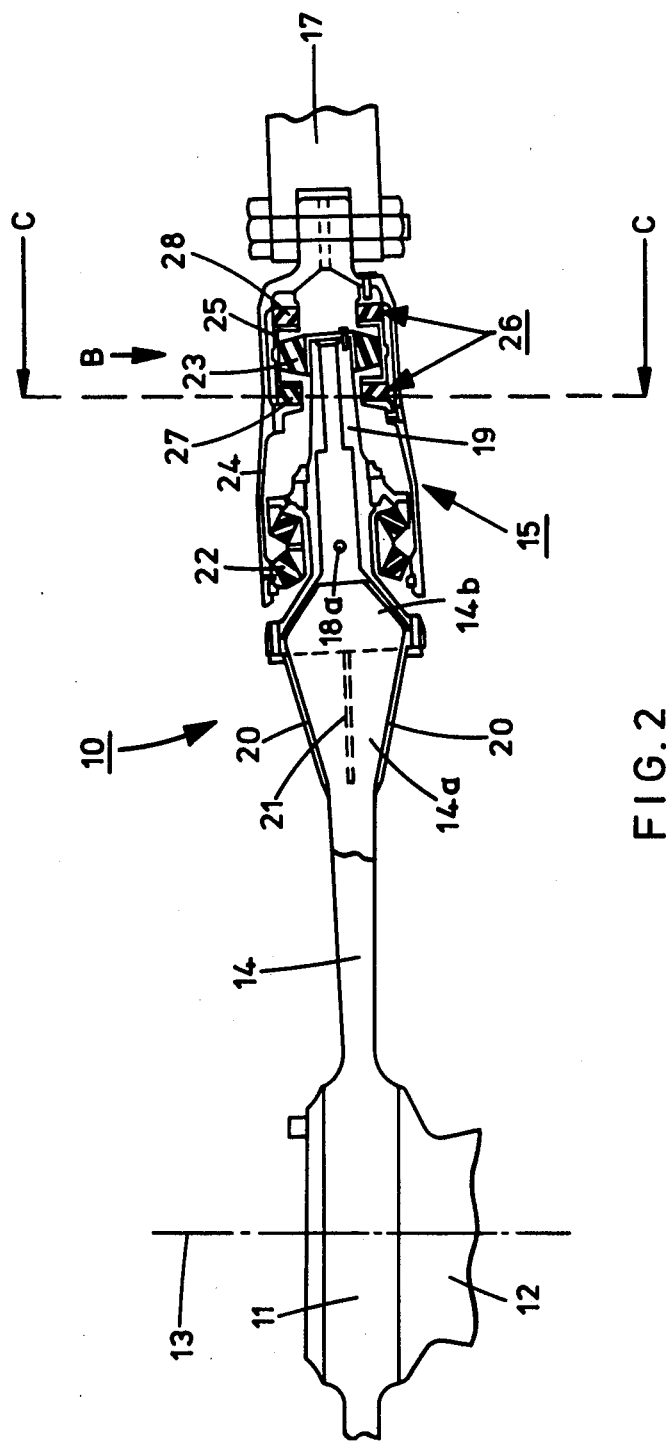
Figure 3:
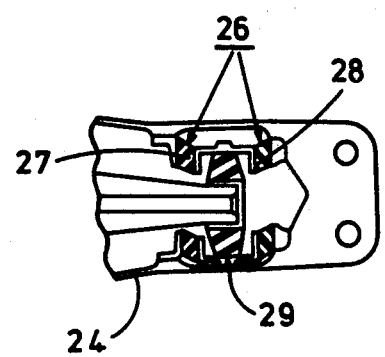
Figure 4:
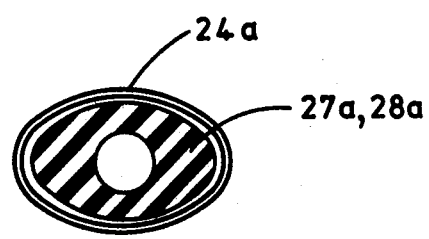

The invention will now be described by way of example only and with reference to the accompanying drawings, in which:

FIG. 1 is a fragmentary planview of a helicopter rotor constructed in accordance with the invention, FIG. 2 is a frgmentary part sectioned view of the rotor of FIG. 1 and taken along line A—A of FIG. 1, FIG. 3 is a sectioned view of part of the rotor in the direction of arrow B in FIG. 2, and FIG. 4 is a sectional view taken along lines C—C of FIG. 2 and showing a modification.

Referring to FIGS. 1 and 2, a helicopter rotor generally indicated at 10 consists of a hub 11 bolted to the top of a generally vertical rotor drive shaft 12 arranged for rotation about a vertical axis 13.

Four flexure members 14 (one only being shown) extend radially from the hub 11. In this embodiment, the hub 11 and flexure members form an integral structure constructed of fibre-reinforced plastics material, and each flexure member tapers from a generally flattened oval cross-sectional shape at its inner end to a generally circular outer end so as to be flexible in a plane perpendicular to the plane of rotation to accommodate the majority of flap movement of an associated rotor blade during operation.

A feathering hinge 15 is provided at an outer end of each flexure member 14, each feathering hinge being provided with an inwardly extending arm 16 for attachment to a flying control system (not shown) through which rotor blade pitch movements are provided during operation. A rotor blade 17 is attached at an outer end of the feathering hinge 15 that is arranged for limited pivotal movement about a pivot point 18 (FIG. 1) in the plane of rotation of the rotor so as to permit blade lead and lag movements during operation of the rotor.

From FIG. 2 it will be seen that the outer end of each flexure member is formed with longitudinally arranged opposed frusto-conical portions 14a and 14b respectively. A tubular metal spindle 19 is attached at an outer end of each member 14 through a flared inner end arranged to mate with the surface of the outer frusto-conical portion 14b. Shaped metal half sleeves 20 are clamped at 21 around the surface of the inner frusto-conical portion 14a, and are bolted through mating circumferential flanges to the flared inner end of the spindle 19.

The spindle 19 supports axially spaced-apart inner and outer elastomeric bearings 22 and 23, respectively, which in turn support a tubular portion 24 so as to be capable of rotational movements about its longitudinal axis, thereby constituting the feathering hinge 15. The rotor blade 17 is attached to an outer end of the tubular portion 24.

Elastomeric bearings 22 and 23 each comprise a plurality of alternate layers of elastomer and reinforcing plates bonded in an assembly that is flexible in torsion and substantially rigid in compression and shear.

Inner elastomeric bearing 22 consists of two in-series generally frusto-conical bearing parts bonded to a support member and having a common geometrical center 18a that defines the lead/lag pivot point 18 (FIG 1). An outer surface of one of the bearing parts is secured to an inner surface of the tubular portion 24 and an outer surface of the other bearing part is secured through a thrust member to the spindle 19. This arrangement of in-series bearing parts minimizes the overall diameter of bearing 22 and transmits centrifugal loads to the hub 11.

The outer elastomeric bearing 23 consists of an annular bearing having an inner surface attached to the end of the spindle 19 and an outer surface bonded to an inner surface of a co-axial tubular sleeve 25.

An elastic shear mounting, generally indicated at 26, is interposed between the sleeve 25 and the tubular portion 24, and serves during operation to permit lead/-lag motion of the tubular portion 24 and associated rotor blade 17 about the lead/lag pivot 18 (FIG. 1).

The elastic shear mounting 26 consists of two annular shear members 27 and 28 located one at each side of the bearing 23. Each shear member 27 and 28 is bonded between a flange formed on an extension of the sleeve 25 and extending generally perpendicularly to the axis of the tubular portion 24 and opposed flanges attached to an inner surface of the tubular portion 24.

In the present invention, the elastic shear mounting 26 can readily be utilized to provide automatic damping of lead and lag movement. Thus by selection of a suitable synthetic viscoelastic material for the shear members 27 and 28 that embodies desired internal friction properties, the shear displacements caused by lead and lag movements will result in an automatic damping force being applied. It should also be noted that, due to the particular construction employed, such damping will be substantially equal in both the lead/lag and flap planes.

FIG. 3 illustrates the shear displacement of the shear members 27 and 28 at a maximum permitted lead condition that is defined by lead/lag stop means comprising an annular projection 29 formed on an outer surface of the sleeve 25 abutting an inner surface of the tubular portion 24.

FIG. 4 shows a modification of the arrangement hereinbefore described in which each of the shear members 27a and 28a is elliptical in cross-section and is located in an elliptical tubular portion 24a arranged with its major dimension aligned with the plane of rotation. Thus, in this arrangement the effective area of the shear mounting is greater than that of the circular shape used in FIG. 2, thereby providing for an increase in the automatic damping force that will be applied during operation, and serves to illustrate a further feature of the invention that concerns the ability to vary and select a desired damping force for a particular installation whilst retaining the frontal area at a minimum to minimize aerodynamic drag.

Passageways are provided through the inner bearing 22 and the sleeve 25 so as to permit air entrained during operation through the open inner end of the tubular portion 24 to flow freely through the assembly and assist in maintaining the bearings 22 and 23 and the shear mounting 26 at a suitable operating temperature.

In operation of the semi-rigid rotor of the present invention, resilient flexing of each flexure member 14 accommodates the majority of the blade flap movements of all the individual parts of the rotor, and rotor blade pitch changes are effected by rotation of the tubular portion 24 about the torsionally flexible inner and outer elastomeric bearings 22 and 23, respectively.

The inner and outer bearings 22 and 23 are substantially stiff in compression so that the majority of blade lead and lag movements of all the individual parts of the rotor are accommodated by displacements of the shear mounting 26, thus permitting pivoting of the tubular portion 24 about the center 18a of the inner bearing 22. Limited cocking movement caused by such displacements are permitted by the inner and outer elastomeric bearings 22 and 23. The shear mounting 26 ensures that, in the area of the rotor in which lead and lag movements occur, the rotor is substantially equally stiff in both the lead/lag and flap planes.

Thus, it will be apparent that a rotor in accordance with the present invention retains the desirable operational characteristics of the prior art rotor, however, in the present rotor, blade lead/lag movements are accommodated in an area coincidental with blade pitch change (or feathering) movements, thereby dispensing with the relatively long outer part of the flexure member in the prior rotor that is located external of the feathering hinge in the prior art rotor. This allows the length of the flexure member in the present rotor to be reduced significantly, thereby minimizing the aerodynamic drag penalty.

Furthermore, the use of the elastomeric bearings reduces maintenance requirements and eliminates the need for a bearing lubrication system. The in-series conical configuration of the inner bearing allows the diameter of the tubular portion 24 to be minimized, thereby further minimizing the drag penalty, and the arrangement of the inner bearing to transmit centrifugal loads eliminates the requirement for a tie bar.

Whilst particular embodiments of the invention have been described and illustrated, it will be understood that various modifications can be made without departing from the scope of the invention as defined in the appended claims. For example, each of the elastic shear members 27 and 28 may consist of a laminated construction comprising a plurality of alternate layers of rubber or elastomer and reinforcing plates. The reinforcing plates may be of any suitable shape, for instance, flat, curved or conical, so as to assist in providing a desired stiffness rate. The integral hub and flexure member assembly may be of other suitable materials such as titanium. This may simplify the attachment of the metal spindle 19. Alternatively, in such an arrangement, the spindle 19 may be formed integrally with the hub and flexure member assembly. The inner elastomeric bearing 22 may be of other suitable configuration and may, for instance, comprise part spherical bearing parts or a combination of frusto-conical and part spherical parts arranged on a support about a common geometrical center.

I claim as my invention:

1. A helicopter rotor comprising a rotor hub for rotation about a generally vertical axis, a plurality of rotor blades, the rotor hub including, for each rotor blade, a generally radially extending flexure member resiliently flexible in a blade flap plane, a feathering hinge mounted at the outer end of said flexure member, said feathering hinge including a tubular portion, means on the outer end of said tubular portion for attachment of a rotor blade, a spindle extending outwardly from said flexure member with the outer end portion thereof disposed within said tubular portion, inner and outer elastomeric bearings disposed in spaced apart relationship on said spindle and supporting said tubular portion and an elastic shear mounting disposed adjacent said outer elastomeric bearing and mounted between said tubular portion and said outer bearing to permit lead and lag movements of the tubular portion and rotor blade about a geometrical center of said inner bearing.

2. A helicopter rotor as claimed in claim 1, wherein the inner bearing comprises two in-series elastomeric bearing parts arranged on a support about the geometrical center.

3. A helicopter rotor as claimed in claim 2, wherein an outer surface of one of said elastomeric bearing parts is rotationally fixed to the tubular portion and an outer surface of said second elastomeric bearing art is secured to said spindle through a thrust member.

4. A helicopter rotor as claimed in claim 1, wherein said outer bearing comprises an annular bearing having an inner surface secured to said spindle and an outer surface secured internally of a co-axial sleeve, said elastic shear mounting being located between said sleeve and an inner surface of said tubular portion.

5. A helicopter rotor as claimed in claim 4, wherein said elastic shear mounting comprises an annular elastic shear member having one surface attached to a flange formed on an extension of one end of the sleeve and extending generally perpendicular to the axis of the tubular portion, and an opposite surface secured to a flange provided internally of the tubular portion.

6. A helicopter rotor as claimed in claim 5, wherein said elastic shear mounting includes a second annular elastic shear member similarly attached at an opposite side of said outer bearing.

7. A helicopter rotor as claimed in claim 1, wherein said elastic shear mounting is constructed of synthetic visco-elastic material.

8. A helicopter rotor as claimed in claim 5, wherein means are provided to limit and lead and lag movements.

9. A helicopter rotor as claimed in claim 8, wherein said last named means comprise an annular projection formed on an outer surface of the sleeve that is arranged to about an inner surface of the tubular portion at permitted extremes of lead and lag movements.

10. A helicopter rotor as claimed in claim 1, wherein said flexure members are constructed of fibre reinforced plastics material.

11. A helicopter rotor as claimed in claim 10, wherein an outer end of each flexure member is formed with longitudinally arranged opposed frusto-conical portions.

12. A helicopter rotor as claimed in claim 11, wherein an inner end of said spindle is flared so as to mate with the surface of the outer frusto-conical portion of the flexure member, shaped metal sleeves being clamped around the inner frusto-conical portion and bolted through mating flanges to the periphery of the flared portion of the spindle.

* * * * *